UNITED STATES PATENT OFFICE.

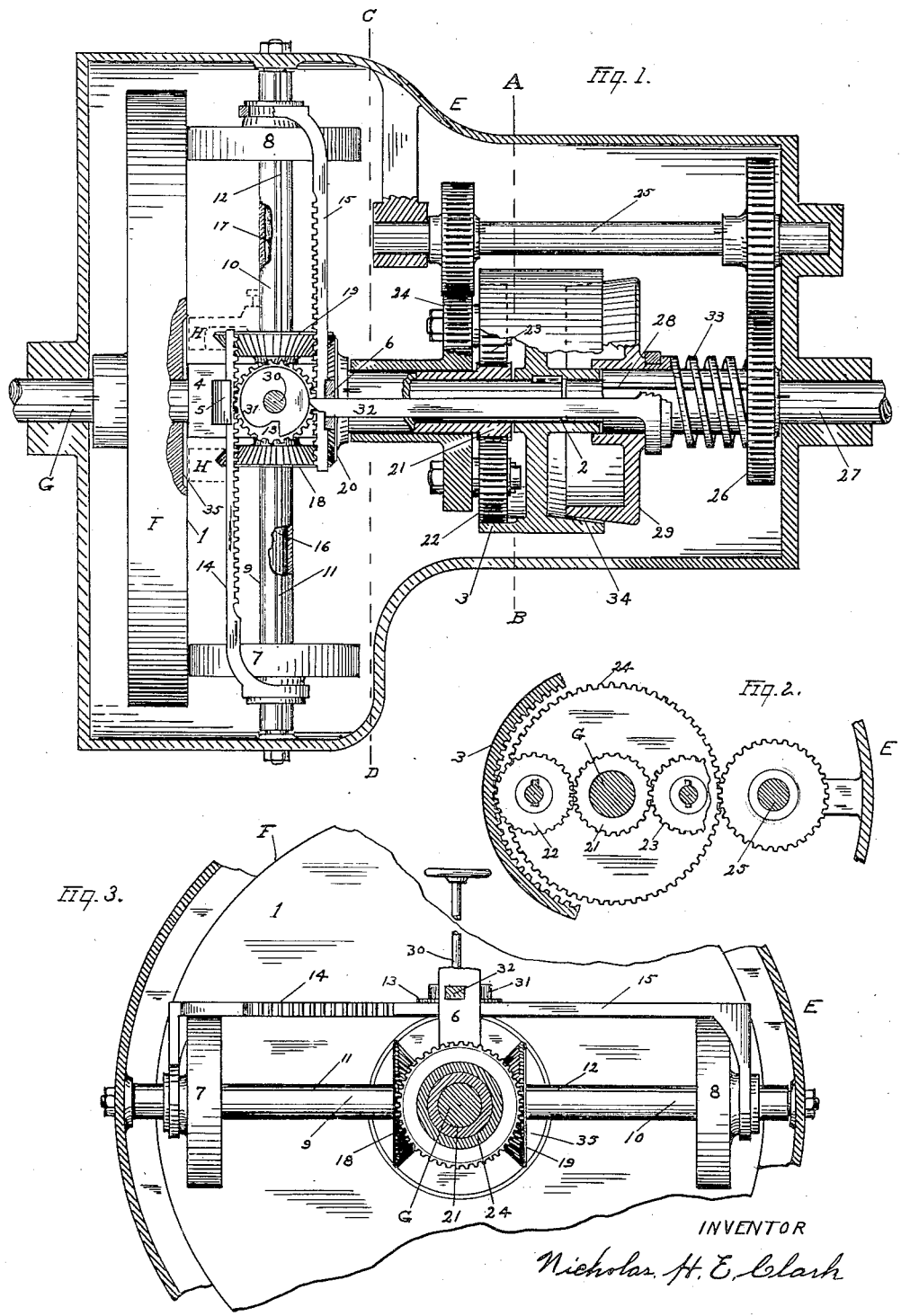

NICHOLAS H. E. CLARK, OF OAKLAND, CALIFORNIA.

VARIABLE-SPEED-TRANSMISSION GEARING.

1,250,967.      Specification of Letters Patent.      Patented Dec. 25, 1917.

Application filed May 17, 1916. Serial No. 98,137.

*To all whom it may concern:*

Be it known that I, NICHOLAS H. E. CLARK, a citizen of the United States, residing at Oakland, in the county of Alameda and State of California, have invented a new and useful Variable-Speed-Transmission Gearing, of which the following is a specification.

My invention relates to variable-speed gearing; and the objects of my invention are, first, to so design a gearing that both the speed and direction of rotation of a shaft may be varied at will without disconnection from the driving power; second, to arrange the gearing in such a manner that the speed may be graduated to any desired fineness without the usual shock attendant upon the step up type of change speed gearing; and third, to divide the transmitted power over two routes, a portion of the power being transmitted direct through the driver shaft and the remainder through a combination of friction and spur gearing to the driven shaft.

I attain these objects by the mechanism illustrated in the accompanying drawings, in which—

Figure 1 is a horizontal section of a transmission box with the gearing shown partly in section; Fig. 2, a vertical cross section through A B of Fig. 1 looking toward the left; and Fig. 3 a similar section through C D showing the friction wheels and operating mechanism therefor.

Similar characters of reference denote similar parts throughout the several views.

E Fig. 1 denotes the gear-box casing which supports the bearings and brackets carrying the working parts within, F is the driver fly-wheel having the plain face 1 to be used as a friction disk, G is the drive shaft keyed to the fly-wheel and terminating in the gear box at 2 where it is keyed to the internal gear 3. Upon the driver shaft G is loosely mounted the bearing block 4 which is supported by wings (not shown) extending to the gear-box walls. This block acts as the inner support and bearing for all the shafting radiating therefrom and for the shifter arm supporting brackets 5 and 6.

The sliding friction wheels 7 and 8 are loosely mounted upon the sleeves 9 10 and slide upon the splines 11 12, the sliding movement being performed by the gear 13 through the shifter arms 14 15 working in the grooved hubs on the friction wheels. The stationary shafts 16 17 are socketed at the inner ends in the block 4 and serve as bearings for the sleeves mounted thereon. The bevel gears 18 19 being keyed to the sleeves rotate in unison with the friction wheels and drive the gear 20, which being keyed to the sleeve pinion 21 drives the gears 22 23 studded to the face of the gear 24. This gear transmits power through the countershaft 25 and the gear 26 to the driven shaft 27 on one side, and the spline 28 to the clutch wheel 29 on the other.

In operation: The friction wheels are shown in their neutral positions, that is, beginning with the driving shaft G transmitting motion through the disk, the friction wheels and bevel gears to the gear 21 in one direction, then from G through the shaft and internal gear 3 in a more direct manner, the planetary gears 22 23 being a variable connection between the two routes. By tracing the rotations and speed of each element and comparing the two routes of transmission with friction wheels in the position shown it will be seen that where the two routes meet at the planetary gears the one will exactly balance the other, the gear 24 remaining stationary. Now if the friction wheels be drawn toward the disk center so as to reduce their speed or rate of rotation the speed is also retarded in the gear 21, allowing the gear 3 to advance in comparison, thus motion is imparted to the otherwise neutral gear 24 and thence through the countershaft to the driven shaft 27. Obviously as the friction wheels are drawn closer to the center and the speed gradually reduced the driven shaft will accelerate in the same proportion until such time as the friction wheels reach nearly to the position shown at H H where the speed of the driver and driven shafts become equal and an equal amount of power is being transmitted over each route, where up to this point the major portion of power is transmitted by the more direct route.

Returning to the friction wheels in positions 7 and 8, rotation of the hand wheel shaft 30 is imparted to the cam 31 and gear 13 engaging the racks 14 15 which, as before stated move the friction wheels inward to gradually reach the positions H H, at which time the notch in the cam 31 will have reached the clutch shifter rod 32, the end thereof dropping into the notch whereupon the spring 33 will press the clutch 29 into engagement with the friction surface 34 of the driver wheel 3, thus making a direct coupling between the two shafts. The friction wheels now being in positions H H in the sinkage 35 of the disk cease to convey power until such time as the gear 13 is reversed to move them into engagement with the disk; then the cam 31 will throw the clutch shifter 32 out, to the position shown in the drawing, and disengage the clutch at the moment of friction engagement.

Speed reduction is made by sliding the friction wheels from the center to the neutral positions as shown at 7 and 8. In the foregoing operations the driver and driven shafts will travel in the same direction. It will be noted that in describing the acceleration operations the friction wheels were moved from the neutral positions shown to the non-operative positions H H, and back to the neutral positions again for a gradual reduction of speed to the zero point. At this time the driven shaft will come to a full stop. Further movement of the friction wheels beyond the neutral point and toward the periphery of the disk will reverse the rotation of the driven shaft by the comparative gain in speed of the gear 21 over that of the internal gear 3, thereby causing the planetary gears 22 23 to travel in the opposite direction while rotating in the same direction, and consequently reversing the gear 24 the reverse rotation being carried through the countershaft to the driven shaft.

The proportions here shown will give a reverse speed of about one-third that of the direct forward speed. A full speed reverse may be obtained, however, by increasing the diameter of the friction disk or otherwise proportioning the gearing.

An obvious advantage is gained by dividing the power over two routes of transmission; first, the friction or regulating gears by having to transmit only half or less of the power may be lighter and with less friction surface; and second, as the required speed of the driven shaft becomes greater the speed of the friction wheels become less, that is, less power is being transmitted over this route and more power over the direct route.

Having thus fully described my invention, what I claim as new and desire to secure by Letters Patent is—

1. A variable speed divided drive transmission, consisting of a main drive shaft, a driven shaft, and auxiliary friction driving mechanism in combination with planetary gearing, power being transmitted over two routes, whereby said main drive shaft transmits a portion of the power at a fixed speed ratio to one element of said planetary gearing, and the remaining portion of the power is transmitted by said auxiliary mechanism at varying speed ratios to a second element of said planetary gearing, a third element of the planetary gearing forming the junction means between the two routes of transmission, means for disengaging said friction driving mechanism and means for simultaneously locking together said main drive and driven shafts, whereby a direct drive through the main drive shaft is obtained.

2. In a variable speed transmission, two routes of transmission, one route consisting of friction wheels combined with bevel gearing, the other route consisting of the driver shaft and an internal gear, with planetary gears connecting said routes, and means for varying the speed of said friction wheels.

3. A variable speed transmission, comprising a driver shaft, a disk mounted thereon, fixed shafts mounted parallel to the face of said disk, sleeves rotating upon the shafts, friction wheels slidably mounted upon the sleeves and in frictional engagement with said disk, bevel gears fixed to the sleeves, an additional bevel gear loosely mounted upon the driver shaft, a spur gear integral with the hub of said bevel gear, a flanged sleeve loosely mounted on said hub, planetary gears mounted upon said flange and in engagement with an internal gear, said internal gear being fixedly mounted upon said driver shaft.

4. A two route variable speed transmission gearing, consisting of a driver shaft, a disk thereon, an internal gear fixed to the shaft at a distance from said disk, and planetary gearing engaging said internal gear whereby power is transmitted from said shaft to said planetary gears at a fixed ratio and comprising one of said routes; fixed shafts, splined sleeves rotatably mounted thereon, friction wheels slidably mounted on the sleeves and in engagement with said disk, bevel gears fixed to said sleeves and engaging with a third gear having an elongated hub and spur gear, said hub being loosely mounted upon the driver shaft, said planetary gears being mounted on the flange of a sleeve rotating upon said hub, and means for sliding the friction wheels upon the sleeves whereby power is transmitted from the driver shaft to the planetary gears at varying ratios and directions, as described, and comprising the second of said routes.

5. A variable speed transmission, consisting of a driver shaft, a disk thereon, an internal gear fixed to the shaft at a distance from said disk, planetary gearing in engagement with the internal gear, adjustable transmission connecting said planetary gears with said disk, a driven shaft in counter gear connection with the planetary gears and in clutch connection with said driver shaft, and means for operating said clutch in unison with the adjusting means of said adjustable transmission.

NICHOLAS H. E. CLARK.